United States Patent [19]
Bretz

[11] Patent Number: 4,977,631
[45] Date of Patent: Dec. 18, 1990

[54] TRUCKER'S BED

[76] Inventor: Franklin E. Bretz, P.O. Box 371361, El Paso, Tex. 79936

[21] Appl. No.: 309,225

[22] Filed: Feb. 13, 1989

[51] Int. Cl.⁵ ............................ A47C 17/64; B60P 3/38
[52] U.S. Cl. ............................................ 5/118; 5/104; 5/127; 267/34; 267/74
[58] Field of Search ................ 5/118, 9 R, 244, 120, 5/127, 129, 181, 104; 267/34, 195, 221, 74

[56] References Cited

U.S. PATENT DOCUMENTS

| | | | |
|---|---|---|---|
| 359,388 | 3/1887 | Hauser | 5/118 |
| 398,517 | 2/1889 | Lawrence | 5/118 |
| 923,953 | 6/1909 | Davis | 267/74 |
| 1,011,789 | 12/1911 | Hoffman | 5/129 |
| 1,386,236 | 8/1921 | Chambers | 5/129 |
| 1,406,737 | 2/1922 | Hoy | 5/129 |
| 1,789,163 | 6/1931 | Tintner | 5/118 |
| 2,690,786 | 10/1954 | Sedlock | 267/221 |
| 3,067,437 | 12/1962 | Campbell | |
| 3,285,652 | 11/1966 | Coup | 5/118 |
| 3,524,673 | 8/1970 | Cramer et al. | |
| 3,612,599 | 10/1971 | Sternberg | |
| 3,698,022 | 10/1972 | Knight | |
| 3,760,436 | 9/1973 | Zach et al. | |
| 3,827,717 | 8/1974 | Whitley | 267/34 |
| 3,882,558 | 5/1975 | Christensen | |
| 3,958,669 | 5/1976 | Schmied | 267/74 |
| 4,107,797 | 8/1978 | Maxwell, Sr. | |
| 4,144,601 | 3/1979 | Anderson et al. | |
| 4,196,483 | 4/1980 | Lefler et al. | |
| 4,497,078 | 2/1985 | Vogel | |
| 4,704,750 | 11/1987 | Wheelock | 5/120 |
| 4,713,851 | 12/1987 | Rosquist | |

Primary Examiner—Michael F. Trettel
Assistant Examiner—F. Saether
Attorney, Agent, or Firm—Shlesinger & Myers

[57] ABSTRACT

A device for suspending a mattress or the like within the sleeping compartment of a truck. The device includes a generally elongated frame with a flat support surface for placing the mattress thereon. The frame may be directly suspended from the walls of the sleeping compartment by spring and shock absorbing devices extending at an angle from the frame. The elongated frame may alternatively be suspended from a peripheral base frame within an open space defined thereby.

14 Claims, 3 Drawing Sheets

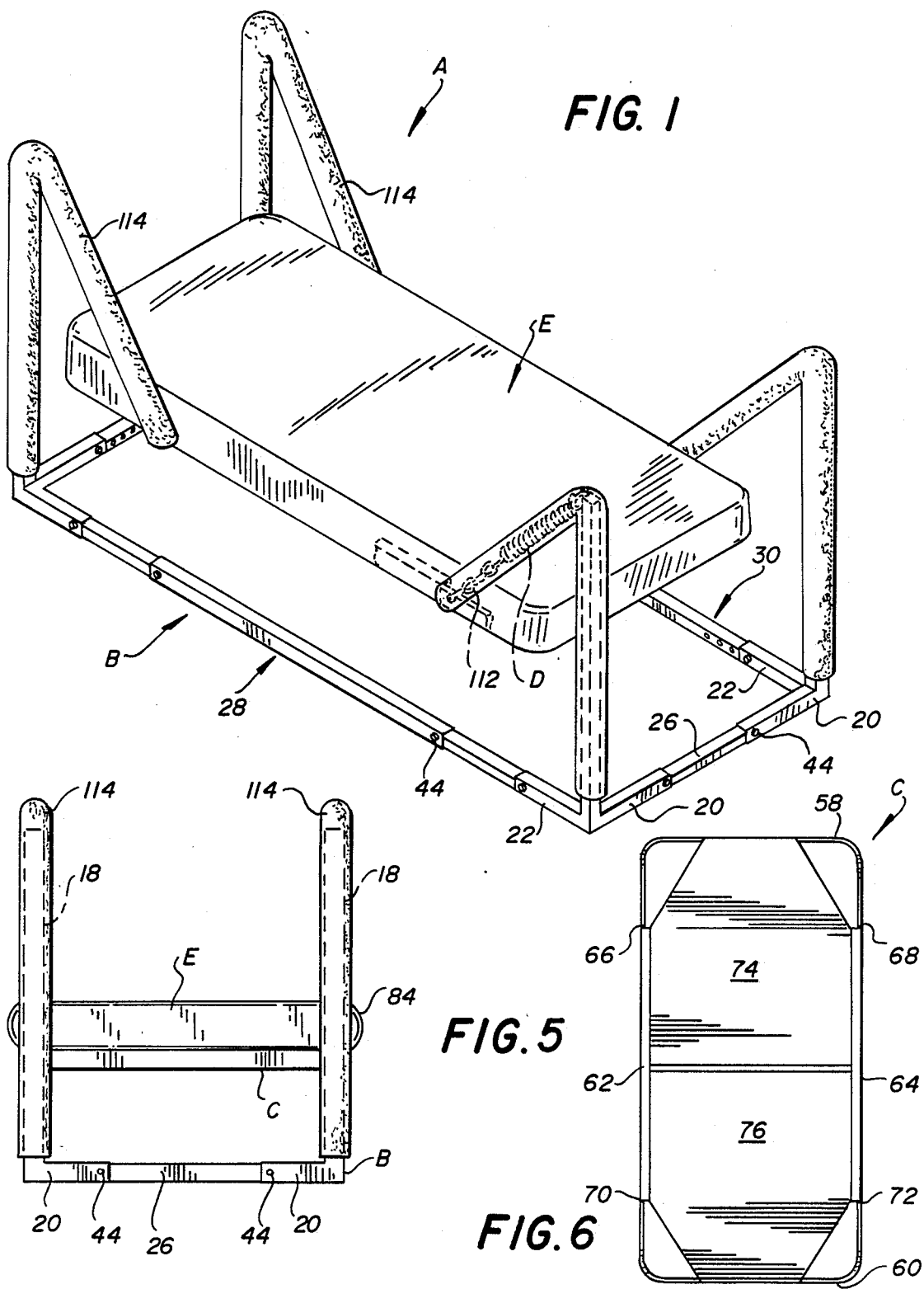

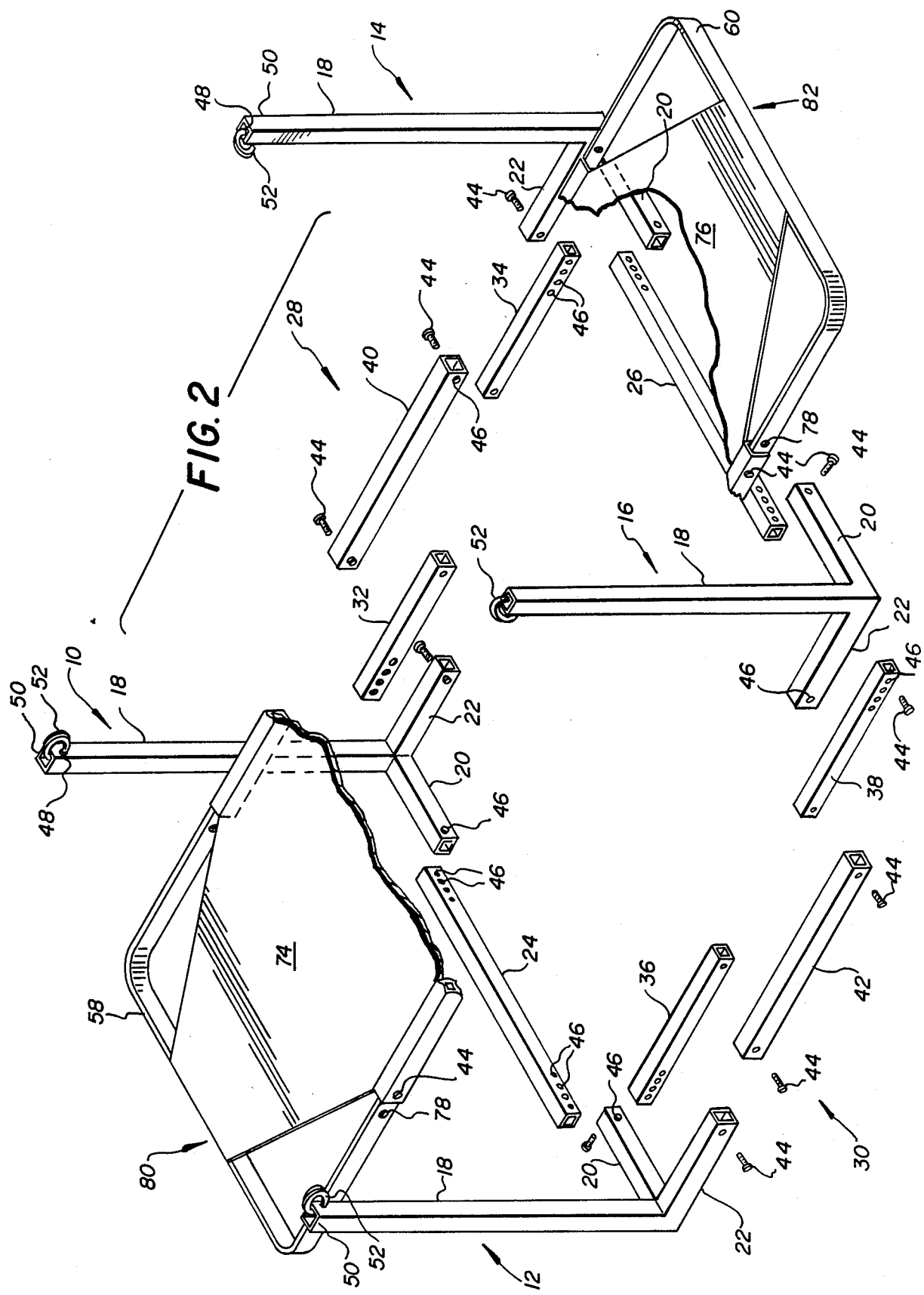

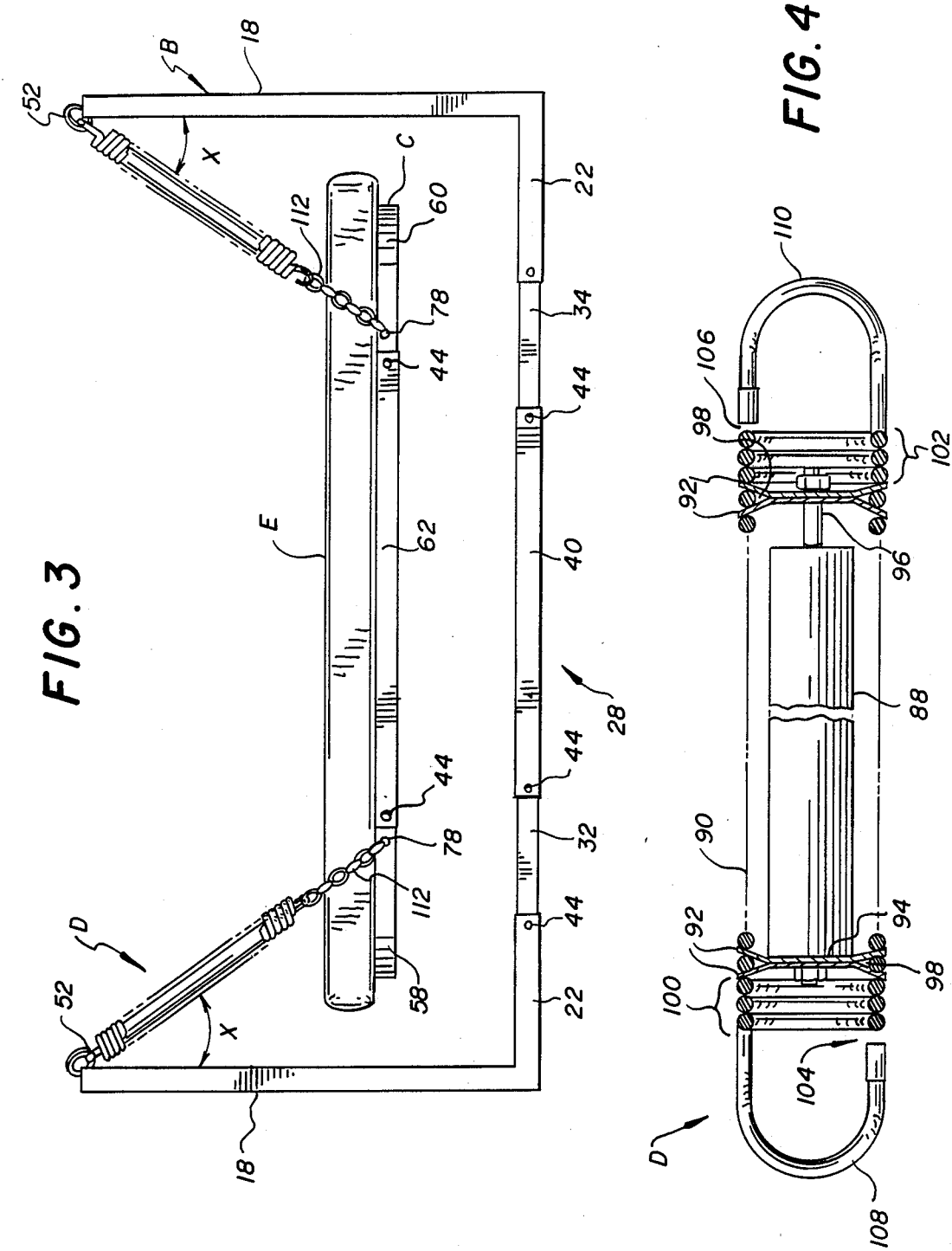

TRUCKER'S BED

HISTORICAL BACKGROUND OF THE INVENTION

The present invention is broadly directed to vehicle mounted beds, and more particularly to a device for suspending a mattress or support padding used in the sleeping compartments or the cabs of large heavy vehicles, such as diesel powered trucks.

Generally, automobiles include highly sophisticated suspension systems which do an excellent job of isolating the passenger compartment from road induced shocks. However, the cab in a diesel powered truck, normally is rigidly coupled to the truck frame and directly transmits to the passengers in the cab all fore-and-aft and vertical and horizontal vibrations that are produced by irregularities and undulations in the road surface. With the ever increasing cost of large trucks and trailer rigs, it has become important to maximize the utilization of these types of vehicles. As a result, it has become a common practice to assign two drivers to a single truck so that it can be driven continuously for long periods of time to reach remote cross-country destinations in a shortest amount of time without having to make several stops along the way to obtain the desired rest. Therefore, the drivers alternate between sleeping and/or resting and driving. It is therefore desirable that the non-driving member of the driving team obtain restful sleep while the other driver member does the driving and vice versa.

Consequently, it has also become a common practice to provide a sleepinq compartment in the trucks in which a mattress or the like can be placed upon which the resting driver may recline and rest. For example, for over-the-road cargo trucks, the sleeping compartment is normally the lofty shelf-like stratum portion at the rearward area of the driving member's cab. In some vehicles of this type, the sleeping compartment including a sleeper bunk is located between the ceiling of the driver's compartment and the roof of the cab.

A recurring problem, however, has been that the sleeping conditions are not ideal. The major reason for this problem is that the vibrations of the vehicle, including vertical bouncing and pitch movements, make it almost extremely difficult for the resting driver to sleep in the sleeping compartment while the vehicle is moving. Even in the reclined position, sleeping is sometimes difficult because of the vehicle's motion. In conventional berths, over rough roads a person in the berth is bounced up-and-down, and as the truck negotiates sharp curves, the person is pushed by the centrifugal force towards the cab sides, and during stops, starts, and abrupt gear shifts, the person is rolled back and forth.

The aforementioned problem is well-known and several systems have been devised by many in this art. For example, see U.S. Pat. Nos. 3,067,437; 3,612,599; 3,698,022; 3,524,673; 3,760,436; 3,882,558; 4,107,797; 4,144,601; 4,196,483; 4,497,078; and 4,713,851. The conventional systems, however, are unduly complicated, expensive to manufacture, and not altogether ideal from the standpoint of actually eliminating or substantially dampening the transmission of vibrations from the vehicle to the bed itself.

Keeping the above considerations in mind, the inventor of the present invention has successfully devised a device for suspending a mattress or the like in, for example, a truck's cab or sleeping berth, in such a manner that person lying thereupon will experience an extremely smooth restful ride, notwithstanding annoying motions or joltings of the truck, particularly on rough roads.

OBJECTS AND SUMMARY OF THE INVENTION

The principal objective of the present invention is to provide a device for suspending a mattress or the like within the cab of a heavy vehicle, such as tractor trailer trucks.

One object of the present invention is to provide a device for suspending a mattress or the like within the cab of a truck which is simple in construction, easy to assemble and disassemble, and provides a comfortable and extremely smooth restful ride for a trucker while the truck is still in motion.

Another object of the present invention is to provide a device for suspending a mattress or the like within the cab of a heavy vehicle which greatly reduces the vibrations transmitted by the vehicle in motion to the sleeping compartment of the vehicle.

Still another object of the present invention is to provide a device for suspending a mattress or the like within the cab of a truck in which the vibrations, shocks and sudden vertical or horizontal jolts of the truck are dampened to such a degree that the sleeping or resting member of the driving team is able to have a restful and undisturbed sleep throughout the entire cross-country driving.

It is yet another object of the present invention to provide a device for suspending a mattress or the like within the cab of a heavy vehicle which can be easily installed in the truck's sleeping compartment.

Still yet another object of the present invention to provide a device for suspending a mattress or the like within the cab of a heavy vehicle which substantially reduces the costs associated with frequent mattress replacements.

An additional object of the present invention is to provide a device for suspending a mattress or the like within the cab of a heavy vehicle which permits ease in installing the mattress on the frame.

A further object of the present invention is to maintain the mattress and frame substantially free of any lateral, forward and rearward movements produced due to rough, uneven, or bumpy roads, or due to shifting of gears, etc.

In summary, the main objective of the present invention is to provide a device for suspending a mattress or the like within the cab of a heavy vehicle which substantially dampens or eliminates vibrations transmitted to the berth or the sleeper while the vehicle is in motion.

BRIEF DESCRIPTION OF THE DRAWINGS

The above and other objects and advantages and novel features of the present invention will become apparent from the following detailed description of the preferred embodiment of the invention illustrated in the accompanying drawings, in which:

FIG. 1 is a perspective view of the device of the present invention showing the inner frame suspended from the base frame;

FIG. 2 is an enlarged exploded view of the device of the present invention without the mattress, showing partially the inner frame;

FIG. 3 is a front elevational view of the device shown in FIG. 1, with portions shown in phantom lines;

FIG. 4 is an enlarged, partial cross-sectional view of the shock absorber loaded spring;

FIG. 5 is an end elevational view of the device shown in FIG. 1; and

FIG. 6 is a top plan view showing the inner frame in reduced dimensions.

DETAILED DESCRIPTION OF THE INVENTION

The device for suspending a mattress or support padding, or the like within the cab of a heavy vehicle shown fully assembled in FIG. 1 and generally designated as A, includes an upright, generally elongated, outer or peripheral base frame B within which is suspended an inner frame C (FIG. 3). The inner frame C suspends from base frame B by shock absorber loaded springs D (FIGS. 3 and 4), which extend downwardly at an acute angle X, from the corners of the base frame B to the inner frame C. It should be noted that although inner frame C has been shown in the drawings as suspended from base frame B, it is well within the scope of this invention to suspend the inner frame C directly from the walls of a cab or like sleeping compartment of a heavy vehicle, such as a tractor trailer truck.

The base frame B, as best shown in FIG. 2, is made of several interconnectable telescopic pieces, preferably made of square or rectangular tubing for easy assembly thereof. More particularly, base frame B includes four corner elements 10, 12, 14, and 16, each of which includes a vertically extending post 18 and two base members 20 and 22 which diverge at a right angle. The corner elements, 10, 12 and 14, 16 are connected together by cross pieces 24, 26 respectively. The longitudinal members of the base frame B generally indicated at 28 and 30, each includes two support members 32, 34 and 36, 38. Support members 32 and 34 are connected by a receptacle member 40 and support members 36 and 38 are connected by a receptacle member 42. As best shown in FIG. 2, support member 32 is received in base member 22 of corner element 10 at its one end and in receptacle member 40 at the other end thereof. Similarly, support member 34 is received in corresponding receptacles 22 and 40. The support members 36 and 38 are likewise received in corresponding receptacles 22 and 42.

Various telescopic members of the base frame B are held together by lock pins 44 which are selectively engaged in punched holes 46. In addition to holding the various telescopic members together, lock pins 44 and punched holes 46 further afford the convenience of adjusting the length and the width of base frame B. This can be easily done by selectively engaging lock pin 44 with any one of the holes 46.

Each post 18 is provided with a punched hole 48 adjacent its free end 50 for hanging a lap link 52 or the like therefrom. Preferably, posts 18 and base members 20 and 22 are about 28" and 10" long, respectively, and about one and one quarter inch in cross section. The receptacle members 40 and 42 are each about 28" in length and about one and one quarter inch in cross section. Similarly, support members 32, 34, 36 and 38 are each about 24" in length and have a cross section of about one square inch. The assembled base frame B is preferably about 80" long and 24" wide.

As best shown in FIG. 6, the inner frame C includes top and foot rail members 58 and 60, each preferably made of a generally rigid metal material in the form of one and three quarter inch strips. Two extension members 62 and 64 are connected to the free ends 66 and 68 of top rail member 58 and free ends 70 and 72 of foot rail member 60. Extension members 62 and 64 are preferably made of square or rectangular tubing such that during the assembly, free ends 66, 68 and 70, 72 of top and foot members 58 and 60, respectively, are inserted therein, and are held together by lock pins 44 selectively engaged in holes 46. This arrangement provides the flexibility of obtaining inner frame C of various desired lengths. Preferably, inner frame C is 76" in length and 24" in width.

In order to complete the inner frame C assembly, two generally flat sheet-metal pieces 74 and 76 are rigidly mounted by welding or the like, within inner frame C, which together function as a support surface or platform 75 for a mattress E or the like. Platform 75 could also be made of another suitable material, which is lightweight and easier to handle. Additionally, platform 75 can be made of one piece or more than one piece, or be made such that additional pieces may be inserted to increase its dimensions.

Holes 78 along the periphery of the inner frame C are also provided for connecting shock absorber loaded springs D. Preferably, holes 78 are positioned at about 8-10" inwardly from the ends 80 and 82 of inner frame C (FIG. 2). It would be apparent to those of ordinary skill in the art that the position of holes 78 from the ends 80, 82, may be varied to obtain the optimum value for angle X. It should be noted that the overall area of inner frame C is smaller than the area of mattress E such that mattress ends 84 formed due to restraints from chain link 112, protrude beyond the peripheral limits of base frame B and inner frame C, shown in FIG. 5. This preferred construction allows mattress E to impact or hit the walls of the cab first, in the instances where inner frame C swings laterally due to the vibrations. One of ordinary skill in the art would appreciate that the effect of any impact of this nature to an occupant of the bed would be substantially less than that of an impact between inner frame C and the walls of the cab. In addition, since only a portion of mattress E, i.e., protrusion 84, first contacts the cab wall slowing inner frame C, before a full contact with the entire mattress wall is made, the effect of any vibrations is greatly dampened.

As best shown in FIG. 4, shock absorber loaded spring D includes a shock absorber 88 mounted within an extension spring 90. Saucer shaped mounting plates 92 are mounted at the ends 94, 96 of shock absorber 88. The mounting plates 92 when joined back-to-back, define a peripheral recess 98 which receives a coil of extension spring 90. As shown in FIG. 4, mounting plates 92 are preferably positioned within spring 90 such that small end portions 100 and 102 thereof, preferably three coils for optimum performance, remain free. (It should be noted that the number of coils in portions 100 and 102, may be varied for obtaining a change in performance).

The free end portions 100 and 102 of extension spring 90 produce two advantages. First, any bumps, shocks, or vibrations of a relatively weak or minor nature are absorbed by the coils in free end portions 100 and 102, without the actuation of shock absorber 88. Second, in the instances where shock absorber 88 is fully extended to its limits, preferably 5", the coils in the free end portions 100 and 102 of extension spring 88, provide additional stretching such that an abrupt or a sudden stop of the fully extended spring is not felt by the occupant of the bed. In other words, the occupant does not feel a "bottoming-out" effect that would be felt when the shock absorber 88 is fully extended, if the stretch limit of spring 90 is limited by the extending limit of shock absorber 88. Preferably, extension spring 90 has a length of about twelve and three quarter inches and can withstand an occupant weight of 100–300 Lbs.

The gaps 104 and 106 between spring hooks 108 and 110 and free end portions 100 and 102 may be filled by a small piece or the like of a flexible rubber material (not shown). This prevents the latching loop of connecting chain link 112 or the like quick link from accidentally becoming disconnected or slipped out from extension spring 90 during vibrations, bumps or the like.

As shown in FIG. 3, chain links 112 connect extension springs 90 with inner frame C and are provided to protect sheets or the mattress, etc., from getting caught in between the coils of spring 90 during its extension and retraction. Preferably, chain link 112 has a length of about 6".

A sheet 114 of a foam, vinyl, or the like material may be wrapped around shock absorber loaded springs D for aesthetics and to protect the occupant of the bed from extension and retractions of extension spring 90.

The shock absorber loaded spring D used in the present invention, is especially advantageous in that it dampens any vibrations transmitted to the sleeping compartment of the vehicle, and therefore, the occupant does not feel constant or continual moving, shaking or swinging of beds, normally present in conventional trucks. Since the beds of the prior art are generally mounted or suspended merely by springs, the bed constantly bounces or shakes up to about 7 times per second, due to snap action and retraction of the springs. This type of annoying effect is eliminated in the device of the present invention by shock absorber 88 which counteracts snap retraction and extension of spring 90. Therefore, the occupant does not feel any vibrations transmitted to the sleeping compartment which, of course, are dampened.

As shown in FIG. 3, shock absorber loaded springs D connect base frame B by lap links 52, with inner frame C by chain link 112 latched in holes 78. Each shock absorber loaded spring D extends between base frame B and inner frame C about a vertical plane in which the corresponding post 18 extends, shown in FIG. 5. Preferably, angle X is about 40°–45° so that any forward and rearward movement of inner frame C is minimized. In addition, since inner frame C is pulled up at its four corners at an approximate angle of 40°–45°, any forward and backward jolts or movements, due to shifting gears or the like, are substantially eliminated. Similarly, any side-to-side or lateral movements are also dampened due to the length of inner frame C being smaller than the length of base frame B.

When assembled, inner frame C suspends closer to the support surface (not shown) than the free ends of post 50 and, preferably, provides a clearance of about 7 inches therefrom (FIG. 3). As described above, since shock absorber 88 may extend up to 5 inches and free end portions 100 and 102 of extension spring 90 allow further extension, the clearance of 7 inches is sufficient to accommodate the extension limit of shock absorber loaded spring D.

As discussed above and shown in FIG. 3, inner frame C hangs substantially close to the support surface. This arrangement provides the occupant with sufficient head room in the generally limited space available in the sleeping compartment of a truck. Normally, the ceiling in a sleeping compartment is about 36 inches high. Therefore, it is critical that sufficient head room be provided for the occupant to get in and out of the bed easily without having to crawl.

Although only one shock absorber loaded spring device has been shown herein to be positioned at each corner of inner frame C, it is well within the scope of the invention to vary the total number thereof, or to vary the mounting position of shock absorber 88 in relation to extension spring 90. In other words, shock absorber 88 and extension spring 90 may be mounted separately, for example, side-by-side, instead of being as an integral unit.

While this invention has been described as having a preferred design, it is understood that it is capable of further modifications, uses and/or adaptations of the invention and following in general the principle of the invention and including such departures from the present disclosure as have come within the known or customary practice in the art to which the invention pertains, and as may be applied to the central features hereinbefore set forth, and fall within the scope of the invention or the limits of the claims appended hereto.

What is claimed is:

1. A device for suspending a bed, comprising:
   (a) a generally elongated frame means including a generally flat support surface for placing the bed thereon;
   (b) a plurality of combination spring and shock absorbing means connected to said frame means;
   (c) means for securing said spring and shock absorbing means to a support means;
   (d) at least one of said spring and shock absorbing means connected to said frame means by a length of a plurality of chain links extending therebetween;
   (e) at least one of said spring and shock absorbing means including a shock absorber loaded extension spring;
   (f) said shock absorber being positioned within said extension spring in a manner that at least one end thereof is mounted short of the corresponding end of said extension spring; and
   (g) said at least one end of said shock absorber being mounted about three coils short of the corresponding end of said extension spring.

2. The device of claim 1, wherein:
   (a) four of said spring and shock absorbing means suspend said frame means from said support means, each extending from at least adjacent a corner portion of said frame means.

3. The device of claim 1, wherein:
   (a) said support surface defining an area smaller than the bed.

4. The device of claim 1, wherein:
   (a) said support surface is made of a generally rigid material.

5. A device for suspending a bed, comprising:
   (a) a first frame means defining an open space;
   (b) a second frame means including a support surface for placing the bed thereon;
   (c) a plurality of combination spring and shock absorbing means for suspending said second frame means from said first frame means in the open space thereof;

(d) said spring and shock absorbing means operably connected to said second frame means about the periphery thereof and extending therefrom to be operably connected to said first frame means;

(e) at least one of said spring and shock absorbing means connected to said second frame means by a length of a plurality of chain links extending therebetween;

(f) said first frame means including a generally rectangular base frame and a plurality of posts extending generally vertically therefrom;

(g) at least one of said spring and shock absorbing means including a shock absorber loaded extension spring;

(h) said shock absorber being positioned within said extension spring in a manner that at least one end thereof is mounted short of the corresponding end of said extension spring; and (i) said at least one end of said shock absorber being mounted about three coils short of the corresponding end of said extension spring.

6. The device of claim 5, wherein:
(a) at least one said post is positioned at each corner of said base frame.

7. The device of claim 5, wherein:
(a) said base frame including means for adjusting the dimensions thereof.

8. The device of claim 5, wherein:
(a) said spring and shock absorbing means correspond in number to said posts so that each said spring and shock absorbing means is operably connected to a corresponding post at one end thereof.

9. The device of claim 5, wherein:
(a) said second frame means defining an area smaller than the open space defined by said first frame means; and
(b) each said spring and shock absorbing means extending from said second frame means about a vertical plane of extension of the corresponding post.

10. The device of claim 5, wherein:
(a) said support surface defining an area smaller than the support padding.

11. The device of claim 5, wherein:
(a) said support surface suspends adjacent said base frame and away from the free end of at least one of said posts.

12. The device of claim 5, wherein:
(a) said second frame means including top and foot end portions;
(b) a pair of said spring and shock absorbing means is connected to said top end portion; and
(c) a pair of said spring and shock absorbing means is connected to said foot end portion.

13. A bed comprising:
(a) an upright, generally elongated first frame means defining an open space;
(b) a generally elongated second frame means including a support surface for placing a mattress thereon;
(c) a plurality of combination spring and shock absorbing means for suspending said second frame means from said first frame means in the open space thereof;
(d) at least one pair of said spring and shock absorbing means connected at least adjacent the top end portion of said second frame means by a length of a plurality of chain links extending therebetween and another pair connected at least adjacent the foot end portion thereof;
(e) at least one of said spring and shock absorbing means including a shock absorber loaded extension spring;
(f) said shock absorber being positioned within said extension spring in a manner that at least one end thereof is mounted short of the corresponding end of said extension spring; and
(g) said at least one end of said shock absorber being mounted about three coils short of the corresponding end of said extension spring.

14. A device for suspending a bed, comprising:
(a) a first frame means defining an open space;
(b) said first frame means including a generally rectangular base frame and a plurality of posts extending generally vertically therefrom;
(c) a second frame means including a support surface for placing the bed thereon;
(d) a plurality of combination spring and shock absorbing means for suspending said second frame means from said first frame means in the open space thereof;
(e) said spring and shock absorbing means operably connected to said second frame means about the periphery thereof and extending therefrom to be operably connected to said first frame means;
(f) each of said spring and shock absorbing means including a shock absorber loaded extension spring;
(g) said shock absorber is positioned within said extension spring in a manner that at least one end thereof is mounted short of the corresponding end of said extension spring; and
(h) said at least one end of said shock absorber is mounted about three coils short of the corresponding end of said extension spring.

* * * * *